United States Patent
Lagnese (10) Patent No.: US 10,565,344 B1
(45) Date of Patent: Feb. 18, 2020

(54) STANDARD CELL DESIGN CONFORMANCE USING BOOLEAN ASSERTIONS

(71) Applicant: PDF Solutions, Inc., Santa Clara, CA (US)

(72) Inventor: Elizabeth Lagnese, San Jose, CA (US)

(73) Assignee: PDF Solutions, Inc., Santa Clara, CA (US)

( * ) Notice: Subject to any disclaimer, the term of this patent is extended or adjusted under 35 U.S.C. 154(b) by 0 days.

(21) Appl. No.: 16/205,875

(22) Filed: Nov. 30, 2018

Related U.S. Application Data (60) Provisional application No. 62/593,704, filed on Dec. 1, 2017.

(51) Int. Cl.
  *G06F 17/50* (2006.01)

(52) U.S. Cl.
  CPC ...... *G06F 17/5072* (2013.01); *G06F 17/5077* (2013.01); *G06F 2217/02* (2013.01)

(58) Field of Classification Search
  CPC ............ G06F 17/5072; G06F 17/5077; G06F 2217/02
  USPC ............................ 716/122, 135, 123; 703/14
  See application file for complete search history.

(56) References Cited

U.S. PATENT DOCUMENTS

| | | | |
|---|---|---|---|
| 5,987,086 A | 11/1999 | Raman | |
| 6,701,289 B1 | 3/2004 | Garnett | |
| 7,653,890 B2 | 1/2010 | Tsai | |
| 7,969,199 B1 | 6/2011 | Jhaveri | |
| 8,136,056 B2 | 3/2012 | Scheffer | |
| 9,870,441 B1 | 1/2018 | Langese et al. | |
| 2010/0246931 A1* | 9/2010 | Kim | G01N 21/956 382/141 |
| 2015/0302134 A1* | 10/2015 | Berkens | G06F 17/5081 716/112 |
| 2016/0132627 A1* | 5/2016 | Tsai | G03F 1/78 716/53 |
| 2017/0352140 A1* | 12/2017 | Isomura | G06T 7/001 |

* cited by examiner

*Primary Examiner* — Phallaka Kik
(74) *Attorney, Agent, or Firm* — Pillsbury Winthrop Shaw Pittman LLP (57) ABSTRACT

Disclosed techniques conform standard cells in an integrated circuit design into a valid template pattern using a template-based approach to standard cell design. The template architecture stores valid patterns of circuit elements for the design. A Boolean expression comprising an aggregated set of Boolean assertions can be generated for each different combination of cell shape features and edge locations with the cell design to compute a solution that matches with a valid pattern in one of the templates. If the solution evaluates to a Boolean TRUE result, the cell shape(s) can be modified in accordance with the solution. If not, the granularity can be updated by incrementing an "adjustment neighborhood" value and iterating the computations for shape features and edge locations using the updated values for the analysis until a Boolean TRUE result is found or it is determined there is no solution for the set of expressions.

20 Claims, 11 Drawing Sheets

Potential Shape Edge Locations

FIG. 4

Mutable rectangle with an adjustment neighborhood

STANDARD CELL DESIGN CONFORMANCE USING BOOLEAN ASSERTIONS

PRIORITY

This application claims priority to and expressly incorporates by reference the corresponding U.S. Provisional Patent Application No. 62/593,704, entitled "Method for Automatically Correcting a Standard Cell Design Using Template Constraints," filed on Dec. 1, 2017.

CROSS REFERENCE TO RELATED APPLICATIONS

This application is related to the U.S. patent application Ser. No. 15/073,493, filed Mar. 17, 2016, entitled "Snap-To Valid Pattern System and Method," now U.S. Pat. No. 9,870,441, which is a continuation-in-part of U.S. patent application Ser. No. 14/289,321, filed May 28, 2014, entitled "Flip-Flop, Latch, and Mux Cells for Use in a Standard Cell Library and Integrated Circuits Made Therefrom," now abandoned, which further claims priority to U.S. Provisional Application No. 61/887,271, filed Oct. 4, 2013, entitled "Template Based Design with LibAnalyzer." U.S. patent application Ser. No. 15/073,493 also claims priority to U.S. Provisional Application No. 62/186,677, filed Jun. 30, 2015, entitled "Template Based Design with LibAnalyzer."

All of the above applications are expressly incorporated by reference in this disclosure.

TECHNICAL FIELD

This disclosure relates generally to semiconductor integrated circuits and methods for designing such circuits, and in particular to standard cell design techniques for integrated circuits.

BACKGROUND

Current commercial tools, such as Synopsys' Custom Designer and Cadence's Virtuoso, support design of standard cells for integrated circuits ("ICs"). These tools provide an interactive design system in which each polygon is placed individually for the cell based on a set of design rules. Design rules for ICs are well known in the electronic circuit design automation ("EDA") industry. Design rules are specific to a particular semiconductor manufacturing process. A set of design rules identifies various geometric and connectivity restrictions to ensure sufficient margins exist in the design of the IC to account for variability in the semiconductor manufacturing process. One use for design rules relates to preventing illegal combinations of polygons in a particular design.

But design rules permit many relationships among polygons or other IC elements, allowing for numerous patterns that typically cannot be verified for manufacturability. A better solution involves a template-based approach utilizing a "templatyzer" tool as described in the related U.S. Pat. No. 9,870,441. A template-based approach to standard cell design minimizes the number of patterns to be verified for manufacturability. A templatyzer tool applies a "golden library" of standard cells to implement a template approach to standard cell-based IC design.

The template-based approach takes a proactive methodology for authorizing acceptable patterns, thereby obtaining a valid pattern corresponding to a physical pattern that can be manufactured in a resulting semiconductor device. Instead of relying on an elaborate set of design rules used in prior art systems (such as e.g., Synopsys' Custom Designer and Cadence's Virtuoso), using template-based design, sanctioned patterns can be designated by their presence in the golden library, which may consist of a small (e.g., 15-25) set of standard cells-referred to as "golden cells"—that contain allowable patterns for the IC design. The set of allowed patterns makes up the template architecture.

Various types of patterns are employed, for example:
a. Route—width+position of long axis;
b. Line end—width+position of short end of rectangle;
c. Size—height+width;
d. Position—center x, y coordinates;
e. Extension—distance from via to edge of enclosing shape;
f. Enclosure—three shortest distances from via to enclosing shape; and
g. X, Y—properties: center position+height/width (which can be a combination of "size" and "position" types above).

SUMMARY

In one aspect, the embodiments described in this disclosure are directed to a system for conforming cell shapes for cells in an integrated design to a template. One or more cell shapes and a set of alternative edge locations for the cell shape(s) can be selected to be conformed to the template. The conformance operations can be based on a specified granularity, referred to herein as an "adjustment neighborhood value." Alternative edge locations may be varied within the bounds of the adjustment neighborhood value and a Boolean expression may be generated based on the specified adjustment neighborhood value. A Boolean expression may include Boolean sub-expressions (referred to herein as "Boolean assertions") for each combination of alternative edge locations within the adjustment neighborhood value and Boolean assertions for one or more features of the cell shape. Each combination of alternative edge locations and cell shape features can be aggregated into Boolean assertions.

A Boolean expression is an equation that can typically be formulated in conjunctive normal form ("CNF"), meaning that disjunctive sub-expressions may be joined with a conjunction, for example: (a OR b) AND (c OR d). In at least certain embodiments, a Boolean expression may include Boolean assertions (sub-expressions) for each combination of alternative edge locations within the adjustment neighborhood value and for one or more features of the cell shape. Boolean satisfiability operations can then be performed on the Boolean expression, which are satisfied when True or False values can be assigned to variables in the expression to make it evaluate to True. A solution for the Boolean expression can be computed such that the solution corresponds with a valid pattern in the template.

In one embodiment the solution may be computed based on matching the Boolean assertions of different combinations of edge locations and shape features with valid patterns in the template. The cell shape(s) under test can be modified in accordance with the computed result when the Boolean expression evaluates to a Boolean TRUE result. On the other hand, when the computed result evaluates to a Boolean FALSE result, the adjustment neighborhood value (granularity) can be incremented and used to update the Boolean assertions based thereon, and can be used to re-compute a result accordingly. In certain embodiments the process can be configured to iterate until a final solution is found or it is determined there is no solution for the set of expressions.

BRIEF DESCRIPTION OF THE DRAWINGS

The above aspects and other features of the innovative techniques described in this disclosure will become apparent to those skilled in the art upon review of the following description in conjunction with the accompanying figures, wherein.

DETAILED DESCRIPTION OF THE EMBODIMENTS

Throughout this description numerous details are set forth in order to provide a thorough understanding of the various embodiments described in this disclosure, which are provided as illustrative examples so as to enable those of skill in the art to practice such embodiments. It will be apparent to those skilled in the art, however, that the techniques described in this disclosure may be practiced without some of these specific details; or in other instances, well-known structures and devices may be shown in block diagram form to avoid obscuring the principles and features described in this disclosure. The drawings and examples provided are not intended to limit the scope to any single embodiment, as other embodiments are possible by way of interchanging of elements.

Where certain elements of these embodiments can be partially or fully implemented using known components, only those portions of such known components that are necessary for an understanding of the embodiments will be described, and detailed descriptions of other portions of such known components will be omitted so as not to obscure the description. Moreover, applicants do not intend for anything in the specification or claims to be ascribed an uncommon or special meaning unless explicitly set forth as such. Further, the scope of the described embodiments encompasses present and future known equivalents of the components referred to herein by way of illustration.

A template definition for a specific technology can be used to determine which pattern types are relevant for specific layers. The template definition may be user modifiable. Positions may be measured as absolute (relative to the lower left corner of the cell), relative to the closest left/right or top/bottom edge of the cell, or relative to the closest metal line or poly track in the cell(s) at issue. The templatyzer tool can compare the patterns in a single cell or an entire library of cells against the patterns in the template definition file. Results can be presented visually and differences viewed interactively. Additionally, the user may choose to view similar valid patterns.

As an additional feature to the above, described herein are innovative techniques to automatically conform a standard cell based on an improvement to the template-based approach as described herein in at least certain of the embodiments. Provided in this present disclosure is a description of an example system upon which the embodiments described in this disclosure may be implemented. Although certain elements may be depicted as separate components, in some instances one or more of the components may be combined into a single device or system. Likewise, although certain functionality may be described as being performed by a single element or component within the system, the functionality may in some instances be performed by multiple components or elements working together in a functionally coordinated manner.

In addition, hardwired circuitry may be used independently or in combination with software instructions to implement the techniques described in this disclosure. The embodiments described in this disclosure are not limited to any specific combination of hardware or software. For example, the described functionality may be performed by custom hardware components containing hardwired logic for performing operations, by general-purpose computer hardware containing a memory having stored thereon programmed instructions for performing operations, or by any combination of computer hardware and programmed components. The embodiments may also be practiced in distributed computing environments, such as in a private or public cloud network, where operations may be performed by remote data processing devices or systems that are in communication with one another through one or more wired or wireless networks.

Figure 1:
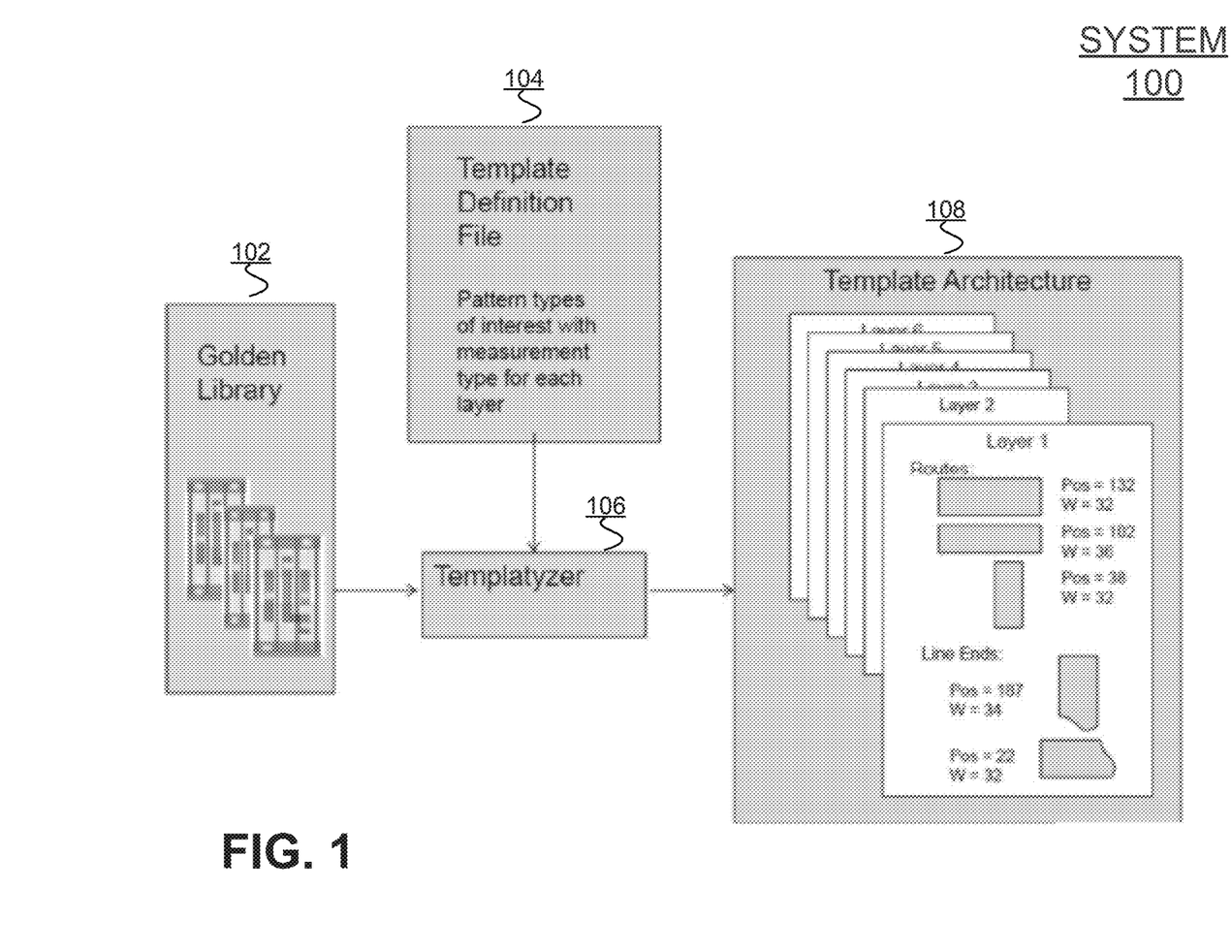
FIG. 1 illustrates a conceptual block diagram of an example template architecture system extracted from a golden library.

FIG. 1 illustrates a conceptual block diagram of an example template architecture system extracted from a golden library. The illustrated embodiment depicts a system 100 wherein a template architecture 108 is extracted from a golden library 102 using a templatyzer tool 106. A template definition file 104 may be used to specify pattern types of interest for each layer in an IC design. Pattern types in an IC design may include routes, line ends, sizes, positions, enclosures, extensions, and/or X-Y properties. As shown, the template architecture 108 includes multiple different layers of an IC design, specifying for each layer the various routes, line ends, sizes and positions, etc. The templatyzer tool 106 may be implemented in hardware, software or combination thereof.

Figure 2:
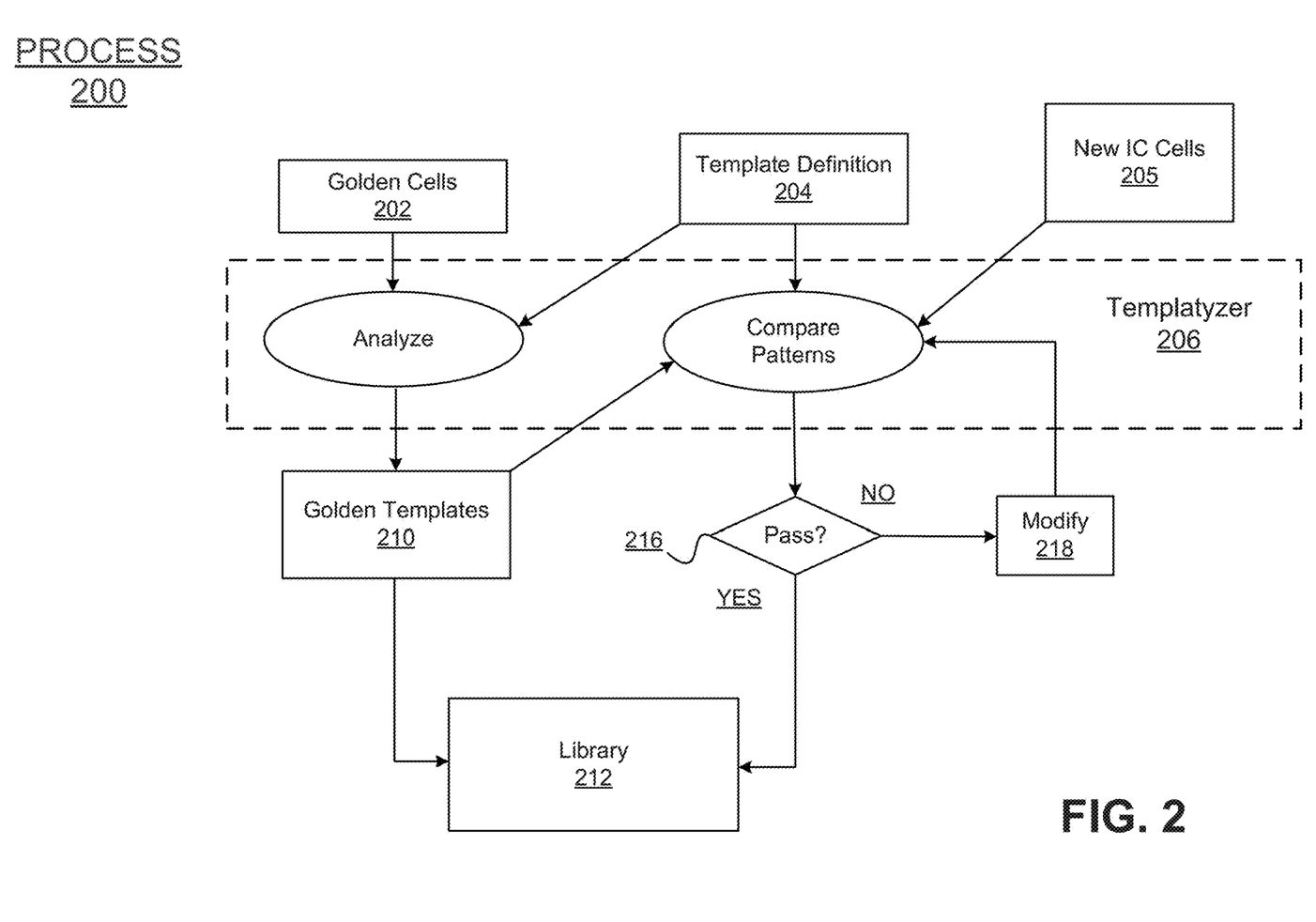
FIG. 2 illustrates a conceptual flow chart of an example process for implementing a template-based library system using a templatyzer tool.

FIG. 2 illustrates a conceptual flow chart of an example process for implementing a template-based library system using a templatyzer tool. In the illustrated embodiment of process 200, the templatyzer tool 206 is shown as receiving (1) one or more cells 205 from a new IC design to be validated (2) a set of golden cells 203 from a golden library of standard cells comprising valid patterns for IC elements, and (3) a template definition (e.g., file) 204 that specifies the types of patterns of interest in each cell that can be matched with the valid patterns for the golden cells 202. In one embodiment, the golden library may comprise a small set of representative cells that include a full set of patterns for the template architecture. The golden cells 203 may form the basis for the library 212 under development.

It should be noted that the template definition 204 may comprise a file or other data structure depending on the details of the particular system implementation. In the illustrated embodiment, the golden cells 203 and the template definition 204 are received and analyzed at templatyzer tool 206. A set of one or more golden templates 210, each corresponding to a golden cell 203, are generated based on the golden cells 202 and the template definition 204. The golden templates 210 may then be provided to be stored in the library 212 under development.

The new IC cells 205 can be provided to the templatyzer tool 206 where they can be compared against the valid patterns of the golden templates 210. If the patterns match at decision block 216 the golden templates 210, they can be stored in the library 212 under development. If the patterns do not match at decision block 216 the cells 205 can be further modified, compared again against the patterns in the golden templates 210, and the process repeats until the cells 205 match a valid pattern in the golden templates 210. Any new patterns in the cells 205 that do not match the golden cells 203 in the golden library 202 can be modified to match standard cells or can be added to the golden library as new standard cells. In at least certain embodiments, the process can be automated in accordance with the techniques described below.

Figure 3:
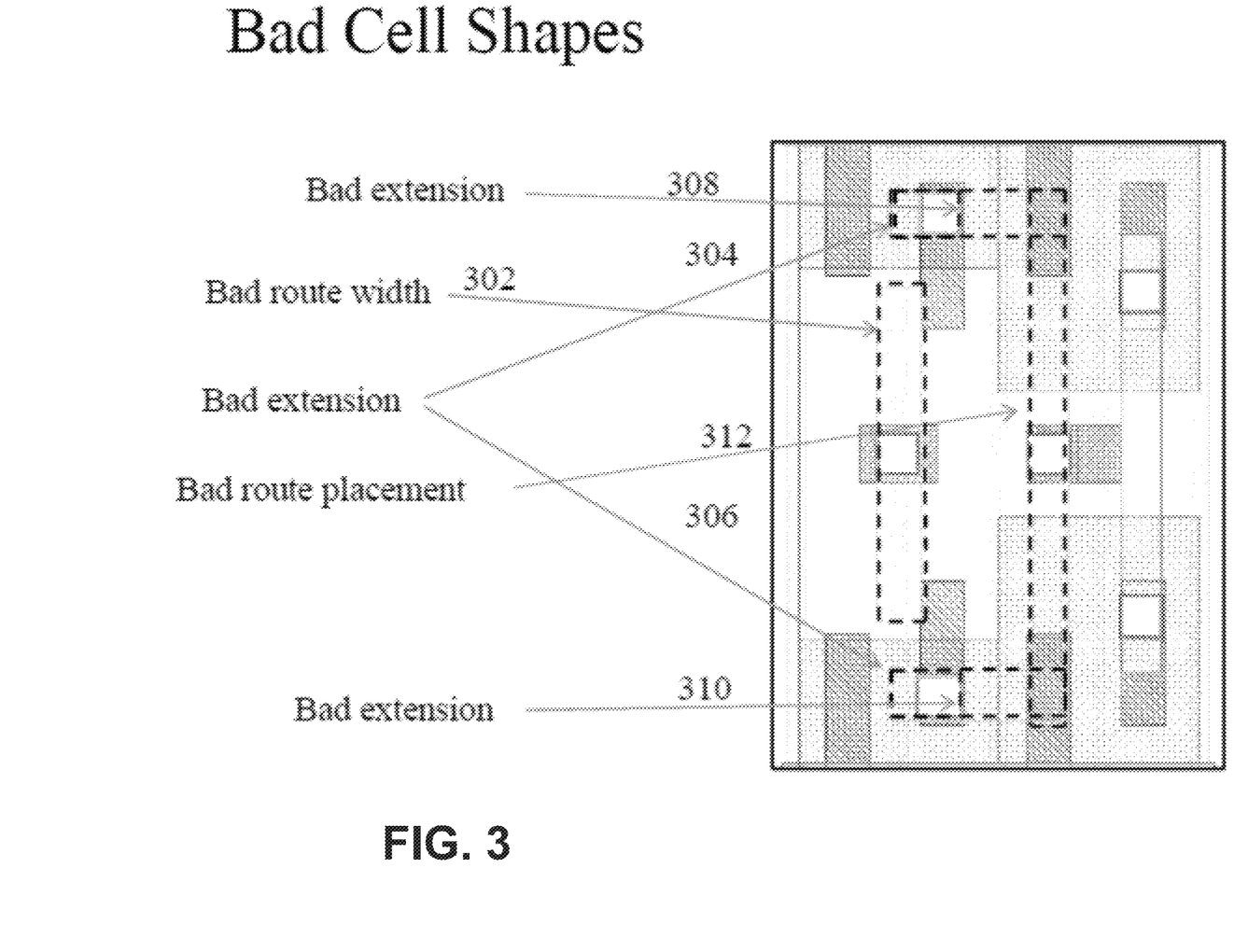
FIG. 3 illustrates patterns extracted from a cell that can be compared against the template library of the templatyzer tool as shown in FIG. 1.

FIG. 3 illustrates patterns extracted from a cell that can be compared against the template library of the templatyzer tool as shown in FIG. 1. Shapes that do not match the template have been marked by the dashed lines. The dotted rectangle 302 illustrates an example of a bad route width. The dotted rectangles 304, 306, 308, and 310 illustrate examples of bad extensions. The dotted rectangle 312 illustrates an example of a bad route placement.

Figure 4:
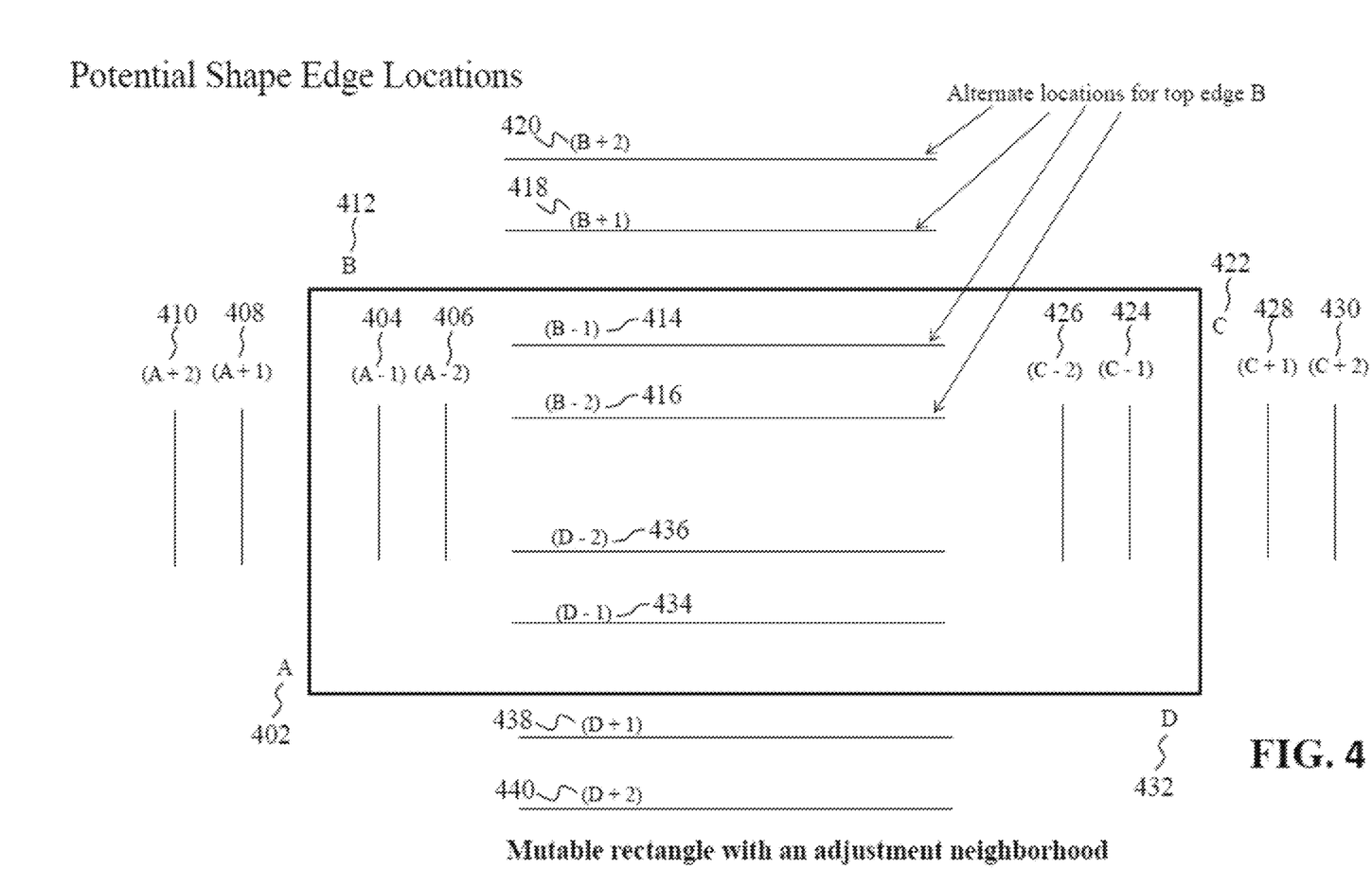
FIGS. 4-5 illustrate examples of a mutable shape for a standard cell comprising a plurality of alternative edge locations in accordance with the techniques described in this disclosure.
Figure 5:
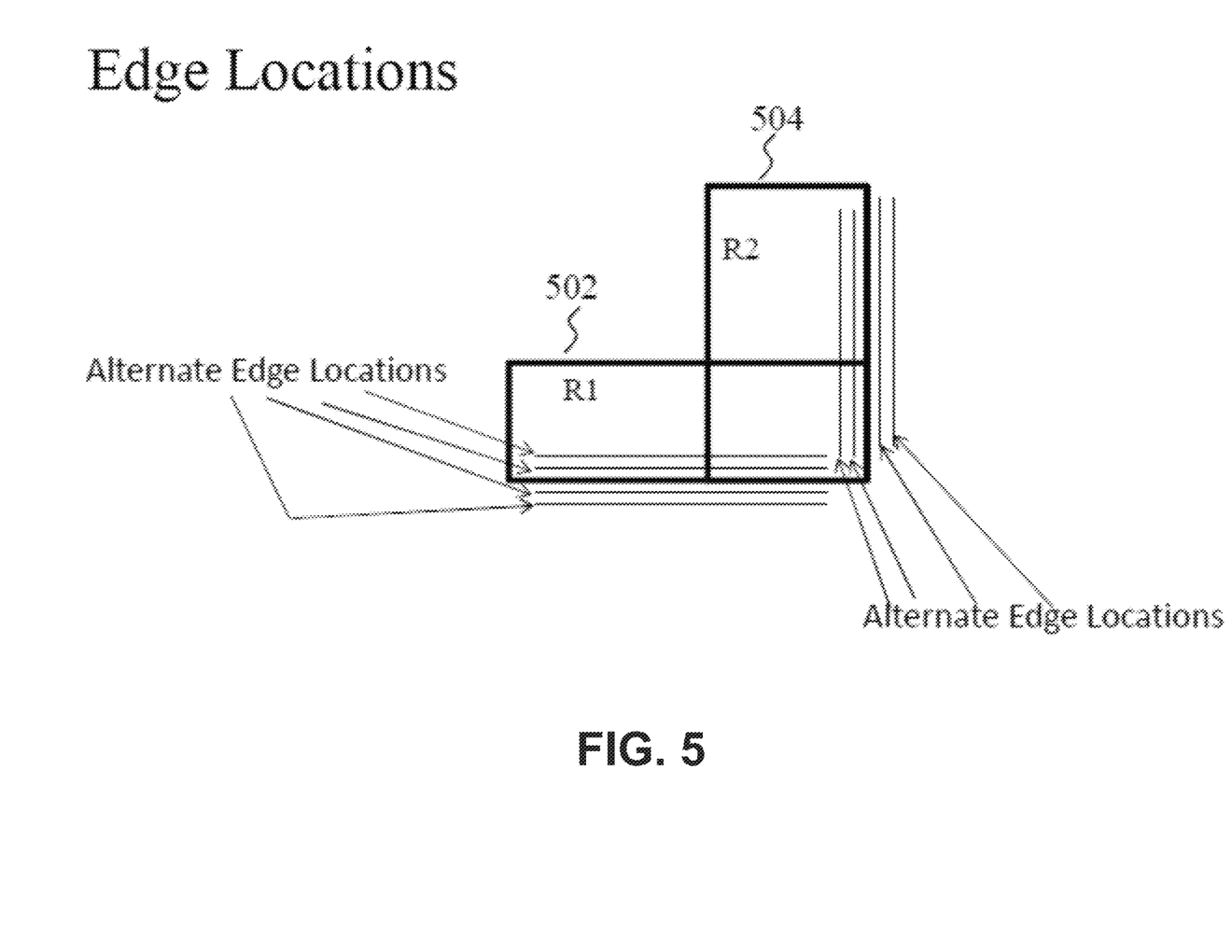

FIGS. 4-5 illustrate examples of a mutable shape for a standard cell comprising a plurality of alternative edge locations in accordance with the techniques described in this disclosure. Illustrated in FIG. 4 is a mutable rectangle with an adjustment neighborhood having a granularity of 2 nm. Other granularities for the adjustment neighborhood may be used. A maximum neighborhood is process dependent. A typical maximum neighborhood is equal to the poly pitch for the process. The alternative edge locations for the mutable shape can be used for comparison against one or more valid templates from a template library as described previously.

In FIG. 4, the mutable rectangle has four edges A 402, B 412, C 422, and D 432. In one example, an adjustment neighborhood may be first defined and the same neighborhood may be used for each edge of each cell shape. A cell shape under test may be checked for all positions for an edge within that neighborhood. Different neighborhoods may be considered for different edges in other examples, which may allow some edges to have more latitude than other edges. In a preferred embodiment, exactly one position may be selected for each edge of a cell shape under test for processing.

A Boolean expression can be defined for the various combinations of edge positions within the selected adjustment neighborhood. As is well known by persons of skill in the art, Boolean is a system of algebraic notation used to represent logical propositions (especially in computing and electronics). The Boolean expression for the combinations of edge positions within the adjustment neighborhood can then be processed to compute a simultaneous solution wherein the sub-expressions evaluate to a Boolean TRUE result. In at least certain embodiments, the Boolean expression may be used for evaluating the standard cells in an automated manner in accordance with the techniques described below. In embodiments, a Boolean assertion refers to a test or condition that generates a TRUE or FALSE result. Each assertion may contain one or more sub-expressions for simultaneous execution.

For the example shown in FIG. 4, the left edge of a polygon (or other shape) may be placed at position A 402 or (A−1) 404 or (A−2) 406 or (A+1) 408 or (A+2) 410, where +1, +2, etc. refers to increments in the adjustment neighborhood value. The top edge of shape may be placed at position B 412 or (B−1) 414 or (B−2) 416 or (B+1) 418 or (B+2) 420. The right edge of shape may be placed at position C 422 or (C−1) 424 or (C−2) 426 or (C+1) 428 or (C+2) 430. The bottom edge of shape may be placed at position D 432 or (D−1) 434 or (D−2) 436 or (D+1) 438 or (D+2) 440. Those of ordinary skill in the art will appreciate that the various positions of the edges A, B, C, and D shown in FIG. 4 are non-limiting illustrative examples as positions may vary within the specified neighborhood (e.g. 2 nm), which may be predefined. There may be certain pattern requirements for the valid patterns in the template(s) that can be used to quantify the various features of the cell shapes under test.

Illustrated in FIG. 5 the corners may be constrained such that they meet at exactly overlapping rectangles of the same layer of a cell template. In other words the right edge of the rectangle R1 502 must be at the same position as right edge of the rectangle R2 504 and the bottom edge of the rectangle R1 502 must be at the same position as the bottom edge of the rectangle R2 504. These are referred to herein as the pattern requirements for ascertaining valid features for the cell shapes under test.

Some such pattern requirements may include:
a. ROUTE—direction+(width+x-center) or (height+y-center)
b. LINE END—width or height+position of short end
c. SIZE—height+width
d. MIDPOS—x and y center
e. X,YPROP—width(height) and x(y) center
f. X,YPOS—x(y) center
g. LEFT/RIGHT—left or right edge
h. TOP/BOTTOM—top or bottom edge
i. EXTENSION—distance between via and enclosure edge+width of enclosure The features of the cell shape under test, also referred to herein as "measures of interest," may be specified for each layer of an IC design in the template architecture. In general the various features of any pattern may be considered together and may be referred to as "template pattern assertions". Exactly one pattern must be TRUE for each shape for which the pattern is defined.

For the purpose of explanation, consider the "SIZE" feature. The size of a cell shape can be measured by its height and width. In general for two valid size combinations (H1,W1) and (H2,W1) in the template architecture, the following example template pattern assertions may be used:

a. Assign temporary variables for each combination
   i. tmp1=H1 AND W1, converted to conjunctive normal form ("CNF"):
      1. $\overline{tmp1}$ OR H1
      2. $\overline{tmp1}$ OR W1
   ii. tmp2=H2 AND W1, converted to CNF:
      1. $\overline{tmp2}$ OR H2
      2. $\overline{tmp2}$ OR W1
b. In the preferred embodiment exactly one of tmp1 or tmp2 is selected as follows:
   i. tmp1 OR tmp2# at least one must be TRUE
   ii. $\overline{tmp1}$ OR $\overline{tmp2}$ # if tmp1 is TRUE, tmp2 cannot also be TRUE (and vice versa)

Figure 6:
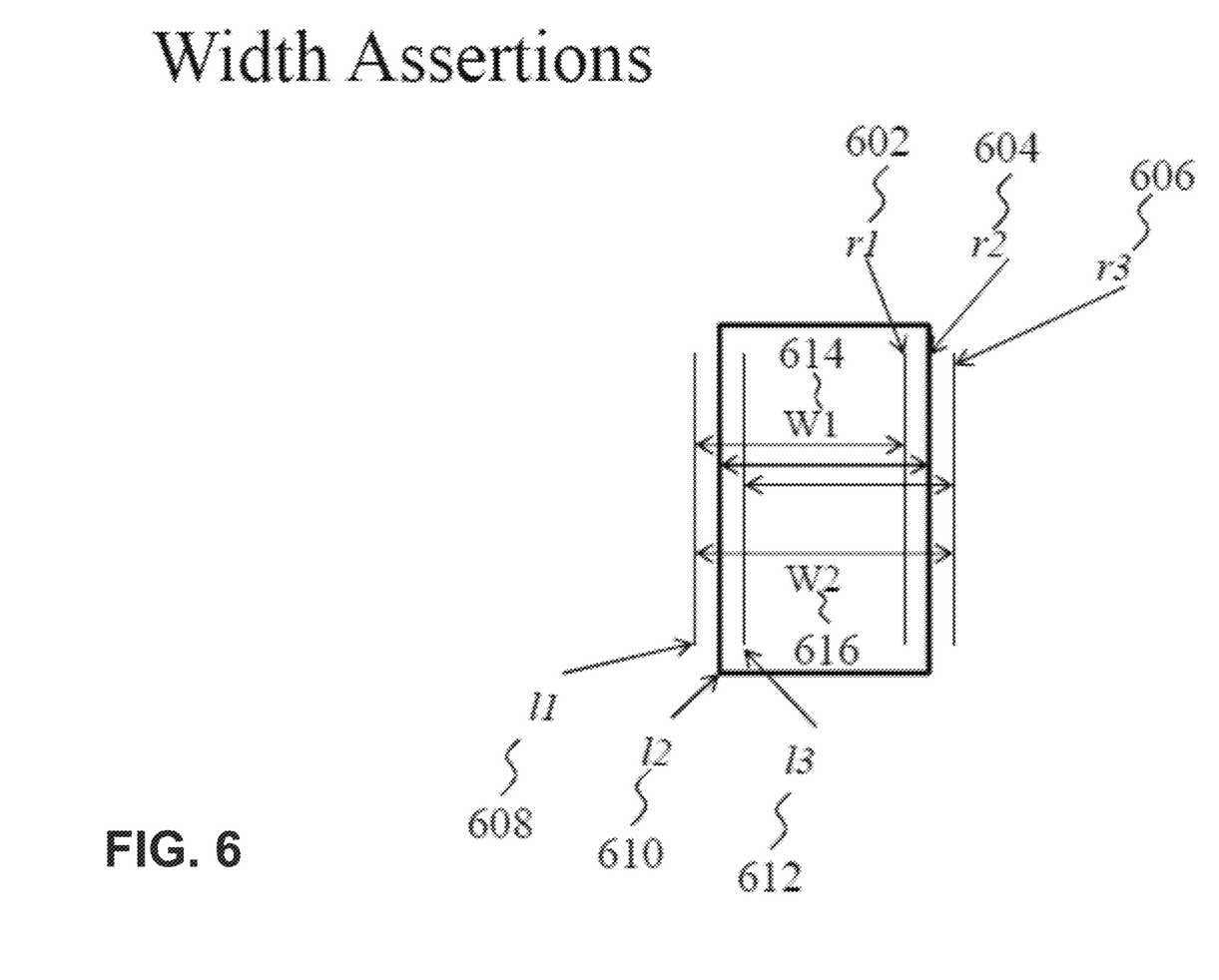
FIG. 6 illustrates a diagram depicting various examples of alternate width options to choose from in a template for a cell under test.

FIG. 6 illustrates a diagram depicting various examples of alternate width options to select from in a template for a cell shape under test. Each feature of each pattern for the cell shape under test can be translated to CNF for further analysis. The width may be given by, for example, width="Right Edge" minus "Left Edge". In such a case, for certain given template width options w1, w2, w3 and certain given edge options l1, l2, l3; r1 602, r2 604, r3 606, where r1−l1=w1 614, r3−l1=w2 616, each of the following Boolean statements must be true simultaneously while assigning temporary variables to valid left/right edge combinations:

a. $\overline{tmp1}$ OR l1# if tmp1, then l1
b. $\overline{tmp1}$ OR r1# if tmp1, then r1
c. $\overline{tmp2}$ OR l2# if tmp2, then l2
d. $\overline{tmp2}$ OR r1# if tmp2, then r2
e. $\overline{tmp3}$ OR l3# if tmp3, then l3
f. $\overline{tmp3}$ OR r3# if tmp3, then r3
g. $\overline{tmp4}$ OR l1# if tmp3, then l1
h. $\overline{tmp4}$ OR r3# if tmp3, then r3

Furthermore, while associating each "tmp" variable with its width, the following must be true:

a. $\overline{w1}$ OR tmp1 OR tmp2 OR tmp3# if w1 is selected for this rectangle, one of tmp1, tmp2 or tmp3 must be true; and
b. $\overline{w2}$ OR tmp4# if w2 is selected for this rectangle, tmp4 must be true.

In this example, exactly 1 "tmp" variable may be selected and the following statements must be true for the chosen variable:

a. tmp1 OR tmp2 OR tmp3 OR tmp4# choose at least one width
b. $\overline{tmp1}$ OR $\overline{tmp2}$ # only one of these can be true
c. $\overline{tmp1}$ OR $\overline{tmp3}$
d. $\overline{tmp1}$ OR $\overline{tmp4}$
e. $\overline{tmp2}$ OR $\overline{tmp3}$
f. $\overline{tmp2}$ OR $\overline{tmp4}$ The rectangle in FIG. 6 may represent a vertical wire. The following Table 1 shows valid routes for a vertical wire.

TABLE 1

| Pattern | Width | Center |
|---|---|---|
| 1 | 34 | 26 |
| 2 | 34 | 30 |
| 3 | 38 | 30 |

According to the present disclosure, Boolean assertions may be defined for every pattern that applies to each cell shape under test. Furthermore, the Boolean assertions require exactly one pattern for each shape and require the edges to match the pattern. For example, consider left edge position in the range of 10-14 and right edge position in the range of 44-48 may yield the following expressions that comport with valid pattern requirements for the cell shape:

1. If width=34 then (left edge offset=10 and right edge=44) OR (left edge offset=11 AND right edge offset=45) OR (left edge offset=12 AND right edge offset=46) OR (left edge offset=13 AND right edge offset=47) OR (left edge offset=15 AND right edge offset=48); and
2. If center=30 then (left edge offset=13 AND right edge offset=47) OR (left edge offset=10 and right edge offset=48).

When both sets of expressions are considered simultaneously the only edge pair that meets the valid requirements of both width and center position to make all assertions TRUE is left edge offset=13 and right edge offset=47.

Figure 7:
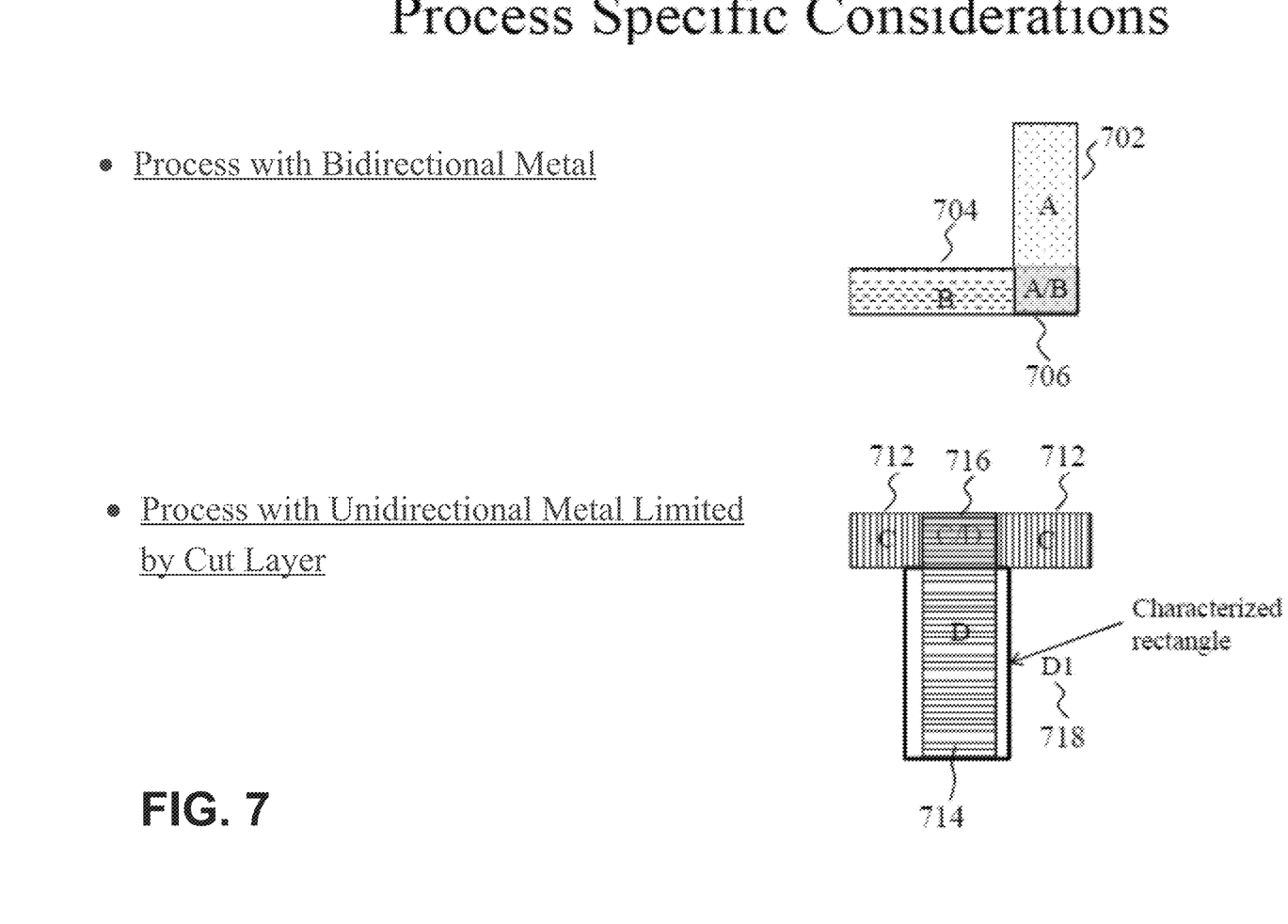
FIG. 7 illustrates examples of process-specific considerations for the techniques described in this disclosure.

Various template pattern assertions may be defined for other features as well. FIG. 7 illustrates examples of process-specific considerations for the techniques described in this disclosure. A process may use bidirectional layers A 702 and B 704. Directional measures may be used to characterize shapes using ROUTES and LINE_ENDS. Processes with cut-limited layers have shapes formed by the intersection of layers, or more commonly, the part of a rectangle that is not intersected by another. As an example, rectangles C 712 and D 714 intersect each other to form an overlapping portion C/D 716. The characterized rectangle D1 718, however, does not intersect the rectangle C 712.

Figure 8:
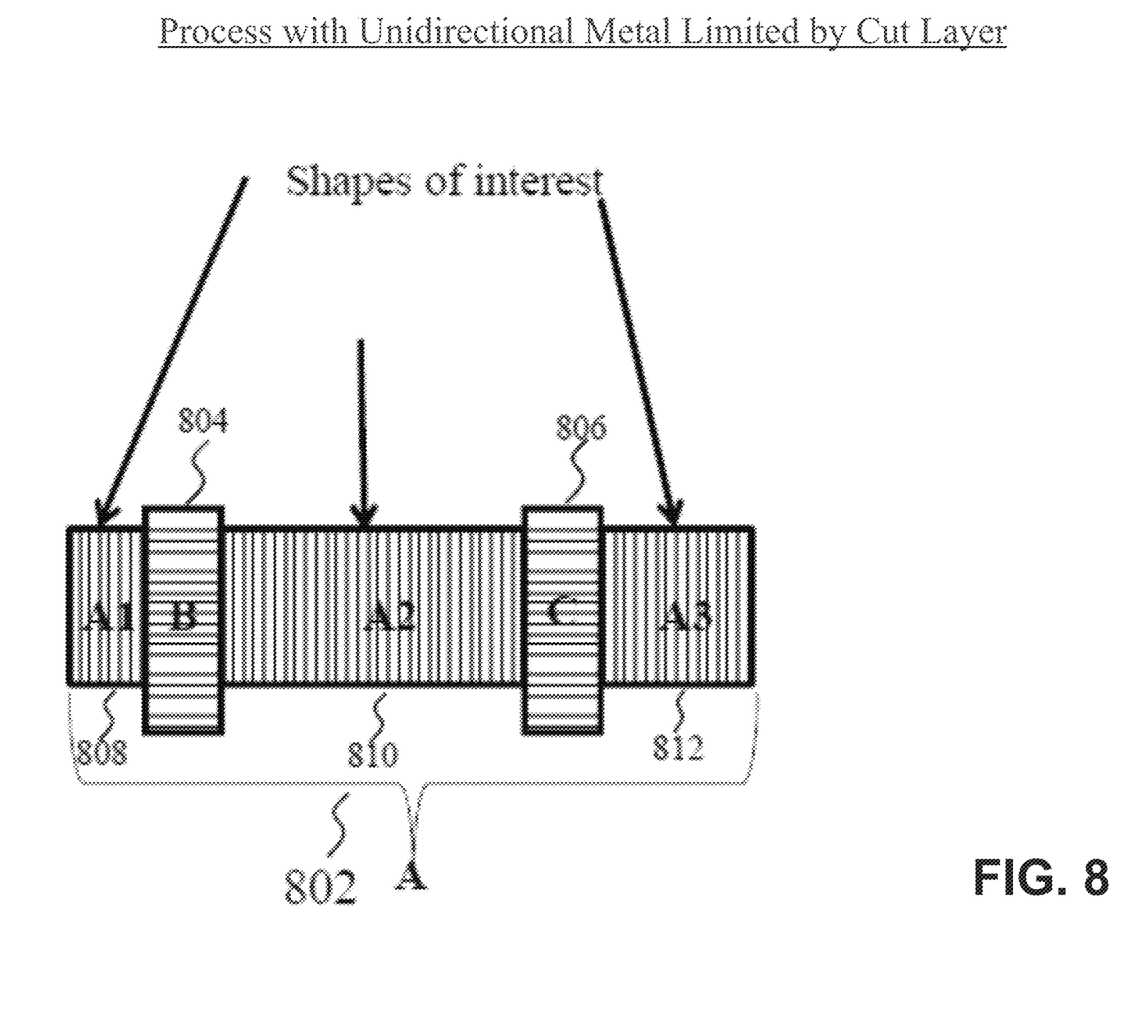
FIG. 8 illustrates an example of process-specific considerations for layers that may be limited by associated cut layers for generating assertions in accordance with the techniques taught in this disclosure.

FIG. 8 further illustrates specific considerations for a process using cut layers to generate various assertions in accordance with the techniques taught in this disclosure. As shown it includes rectangles A, B, and C. For the non-intersecting rectangle, the Boolean assertion may be generated in the same way as a rectangle defined by a single layer, but edge variables may be translated back to the layout as the edges of the multiple rectangles that define it. A directional rectangle (e.g., horizontal) may be cut into rectangles of the opposite orientation.

In FIG. 8, rectangle A 802 is divided by rectangles B 804 and C 806. The resulting rectangles A1 808, A2 810, and A3 812 are the shapes of interest. Assertions may be generated based on these rectangles. Changes to the left/right edges may be propagated to rectangles B and C. The direction of the resulting rectangles, and thus the relative length of a side may not be of interest. Line ends used for bidirectional layers are not appropriate because they measure the short end of a rectangle. Top/Bottom Left/Right edges may be used instead.

All assertions may be combined into a single Boolean statement, which can be fed to a Boolean satisfiability engine. As used herein the term "Boolean satisfiability engine" refers to a computer hardware and/or software unit configured to determine a consistent set of features that make the overall Boolean statement true. The resulting TRUE features define the placement of all edges in the standard cell.

Figure 9:
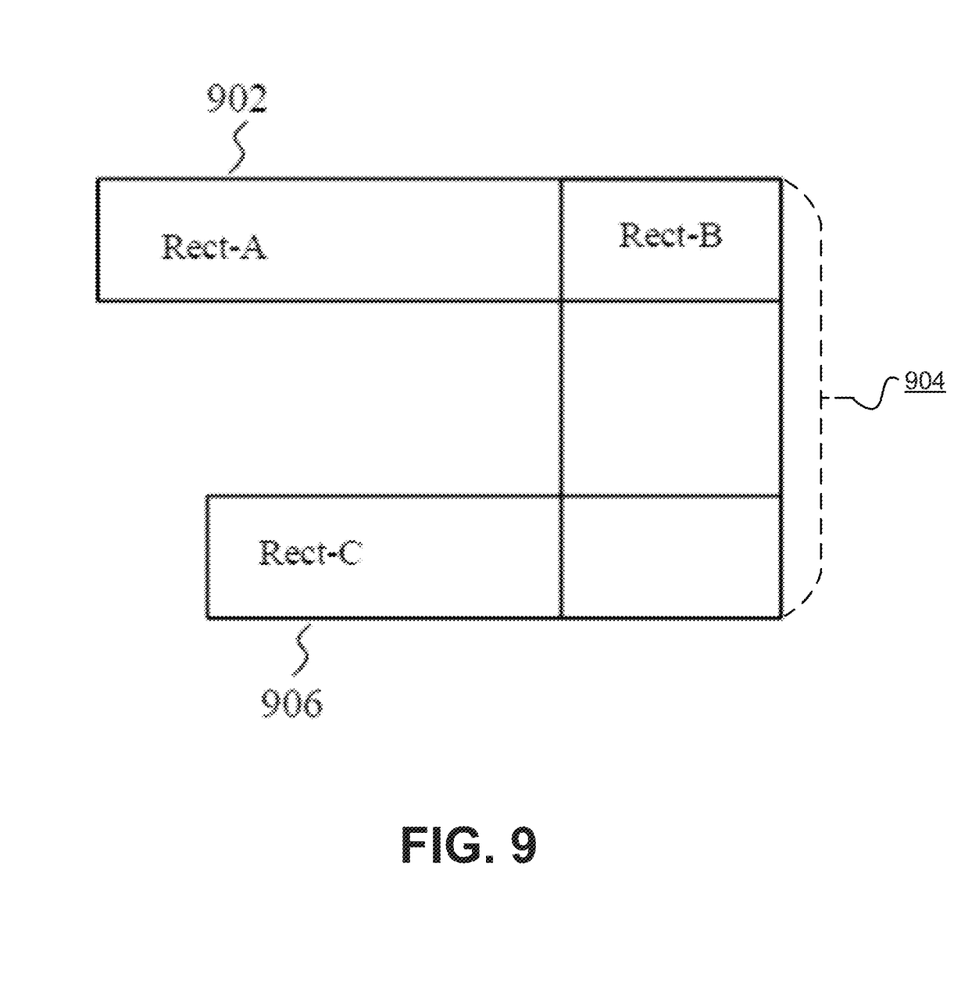
FIG. 9 illustrates example design shapes to be used as part of the process for standard cell conformance in accordance with the teachings of the present disclosure.

FIG. 9 illustrates example design shapes to be used as part of the process for standard cell conformance in accordance with the teachings of the present disclosure. FIG. 9 illustrates an example design shape including rectangles Rect-A 902, Rect-B 904, and Rect-C 906. Subsets of the shapes within the cell are selected for consideration in the conformance process. Relevant rectangles are selected based on the following rules:

a. Rectangles that don't match template (Rect-A) 902;
b. Rectangles in the same layer that touch Rect-A 902, Rect-B 904—edges coinciding with Rect-A 902 (Rect-B top and right) may be moved while others are locked in place;
c. Step B may be applied recursively so that Rect-C's right edge (only) is mutable; and
d. The rectangles define a Fix Set—overlapping sets can be merged for simultaneous correction.

Figure 10:
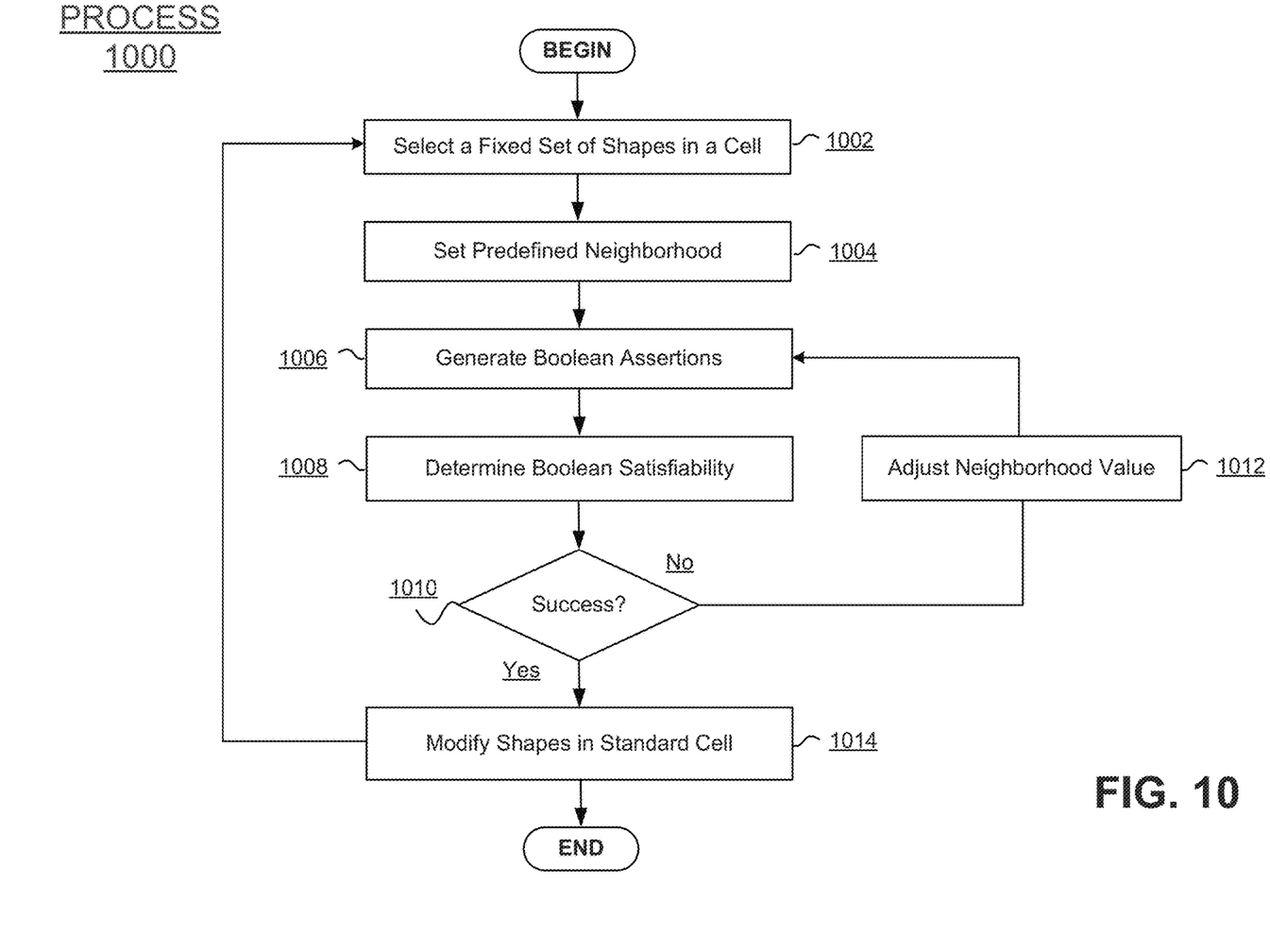
FIG. 10 illustrates a conceptual flow chart depicting an example embodiment of an automated process for standard cell conformance in accordance with the techniques described in this disclosure.

FIG. 10 illustrates a conceptual flow chart depicting an example embodiment of an automated process for standard cell conformance in accordance with the techniques described in this disclosure. It is noted that the process described below is exemplary in nature and are provided for illustrative purposes and not intended to limit the scope of the disclosure to any particular example embodiment. For instance, methods in accordance with some embodiments described in this disclosure may include or omit some or all of the operations described below, or may include steps in a different order than described in this disclosure. The particular methods described are not intended to be limited to any particular set of operations exclusive of all other potentially intermediate operations. In addition, the operations may be embodied in computer-executable code, which may cause a general-purpose or special-purpose computer hardware to perform operations. In other instances, these operations may be performed by specific hardware components or hardwired circuitry, or by any combination of programmed computer components and custom hardware circuitry.

For a given neighborhood, a set of Boolean assertions can be generated for all shapes of interest and combined into a single Boolean expression wherein all the assertions evaluate to True simultaneously (e.g., AssertionA AND AssertionB AND AssertionC, AND . . . ). If individual variables in the Boolean expression can be consistently assigned True or False such that the overall equation evaluates to True, then the equation can be said to be satisfiable as a solution has been found. True variables assert values for parameters of the shapes. Assertions in one set may include parameters for multiple related shapes of different layers.

In the illustrated embodiment, process 1000 begins at operation block 1002 wherein a fixed set of shapes of a cell as defined by the rectangle shapes (or other polygons) may be selected for performing the analysis and at block 1004 a neighborhood value may be set as discussed above. For example, the value may be equal to 2 nm may be selected. At block 1006, the various Boolean assertions may be generated (based on rules explained above) for each shape in the fixed set of shapes for the cell under test selected in block 1002.

At block 1008, the system may be configured to compute a Boolean satisfiability for each of the set of shapes in the cell under test and at decision block 1010 it can be determined whether the cell shape(s) under test passed successfully, meaning that all of the Boolean assertions (sub-expressions) can be simultaneously satisfied for the selected set of shapes. In one embodiment, the operations of process 1000 may be automated whereby different ones of the expressions generated at block 1006 may be tested in an iterative manner for each shape in the set and for each neighborhood value of a plurality of neighborhood values provided for the analysis until a Boolean TRUE result is achieved.

If there is a simultaneous solution for one of the set of Boolean assertions generated at block 1006, then process 1000 continues to block 1014 where the shapes in the fixed set of shapes for the cell may be modified in accordance with the computed solution and the process 1000 repeats at operation block 1002 where additional shapes in a cell under test may be tested, if any, until all shapes are evaluated. At block 1014 the shape edges in the cell selected by the satisfaction of the Boolean assertions may be modified. If there is no solution for the set of Boolean assertions generated at block 1006, then the neighborhood may be adjusted at block 1012. For instance, the adjustment neighborhood value may be doubled or multiplied by some factor greater than one.

Process 1000 continues back to block 1006 where more assertions may be generated based on the adjusted neighborhood value and the process repeats until a simultaneous solution is found or it is determined that no solution is possible for any set of Boolean assertions. In one aspect of this disclosure, the algorithm either selects a valid configuration or fails to provide any solution. A valid configuration can be defined by the template architecture. An incomplete template definition can result in an unreasonable configuration.

A user interface may also be provided in the system that includes two modes of operation. In the first mode of operation, all nonconforming cell shapes may be corrected. In a second mode of operation, one set of nonconforming cell shapes may be corrected at a time and the user may have the option to accept or reject the change. The conformance algorithm may further include template assessments which may establish relationships between distinct shapes.

Embodiments of the present disclosure may be practiced using various computer systems including hand-held devices, microprocessor systems, programmable electronics, laptops, tablets and the like. The embodiments can also be practiced in distributed computing environments where tasks are performed by remote processing devices that are linked through one or more wire-based or wireless networks. A hardware and/or software module may be implemented mechanically, electronically, or any suitable combination thereof. Computer hardware may include dedicated circuitry or logic that is permanently configured to perform certain operations. For example, a hardware module may be a special-purpose processor, such as a Field Programmable Gate Array ("FPGA") or an Application Specific Integrated Circuit ("ASIC"), Programmable Logic Device ("PLD"), etc. Computer hardware module may also include programmable logic or circuitry that is temporarily configured by software to perform operations. For example, computer hardware may include software executed by a general-purpose processor or other programmable processor. Once configured by such software, hardware modules may become specific machines (or specific components of a machine) tailored to perform one or more configured functions.

It will be appreciated by persons of skill in the art that the decision to implement a hardware module mechanically in dedicated and permanently configured circuitry or in temporarily configured circuitry (e.g., configured by software) may be driven by cost and time considerations. Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain of the operations described in this disclosure.

Similarly, the functions described in this disclosure may be at least partially processor implemented, with a particular processor or processors being an example of computer hardware. For example, at least some of the operations described herein may be performed by one or more processors or processor-implemented hardware modules. Moreover, the one or more processors may also operate to support performance of the relevant operations in a cloud computing environment or as software as a service ("SaaS"). In addition, at least some of the operations may be performed by a group of computers (as examples of machines including processors), with these operations being accessible via a network (e.g., the Internet) and via one or more appropriate interfaces, e.g., an application programming interface ("API").

Figure 11:
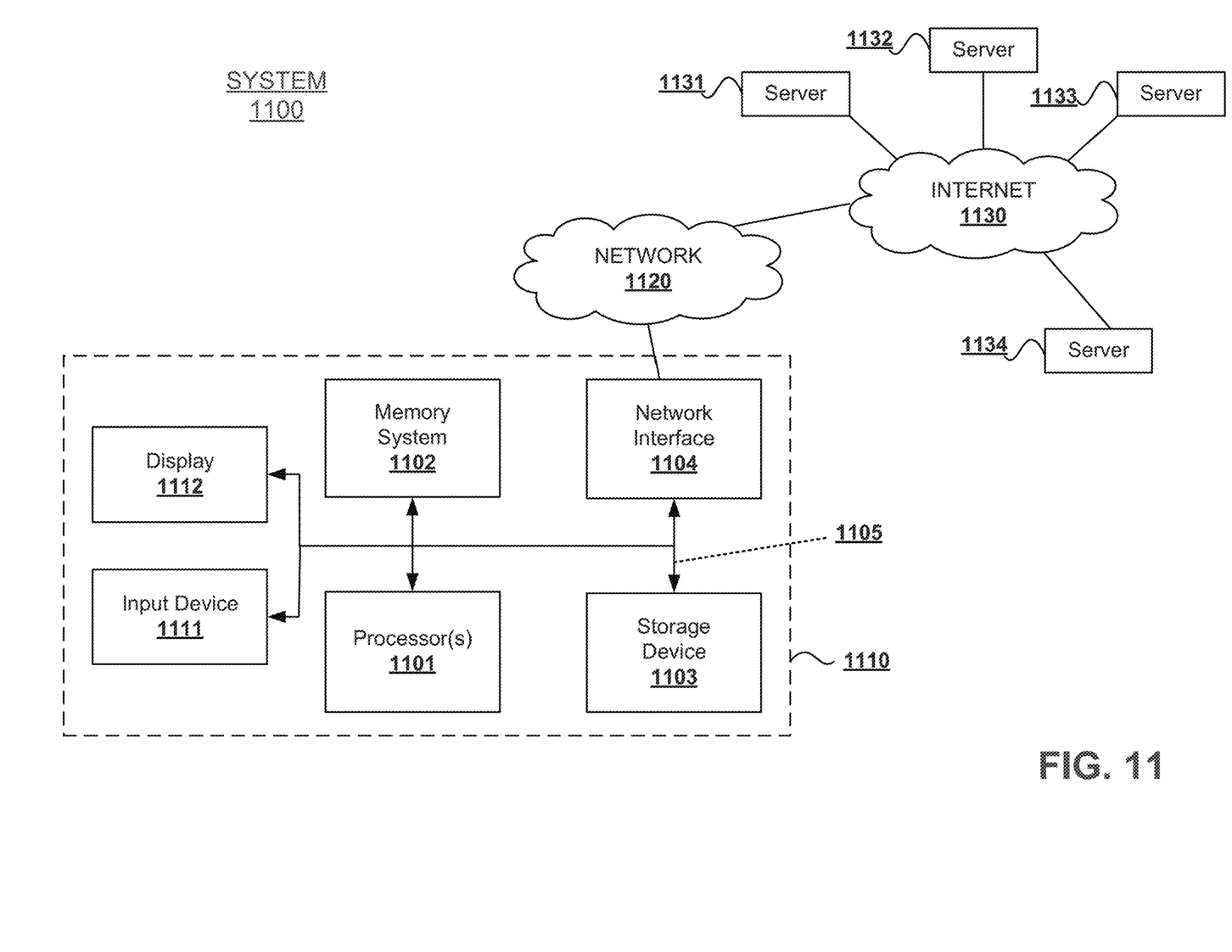
FIG. 11 depicts an example overview block diagram of a system upon which the embodiments described in this disclosure may be implemented.

FIG. 11 depicts an example overview block diagram of a system upon which the embodiments described in this disclosure may be implemented. It is to be understood that a variety of computers configurations may be used to implement the described techniques. While FIG. 11 illustrates various components of a system 1100, it is not intended to represent any particular architecture or manner of interconnecting components. It will also be appreciated that network computers and other data processing systems, which have fewer components or additional components, may be used. System 1100 may, for example, comprise a workstation, personal computer, laptop computer, tablet, smartphone, or other hand-held wireless device, or any device having related functionality.

In the illustrated embodiment, system 1100 includes a computer system 1110. Computer system 1110 includes an interconnect bus 1105 (or other communication mechanism for communicating information) and one or more processor (s) 1101 in communication with the interconnect bus for processing information. Computer system 1110 also includes a memory system 1102 in communication with the one or more processors 1101 via the interconnect bus. Memory system 1102 may be configured to store information and instructions to be executed by the processor 1101, including information and instructions for performing the innovative techniques described above. This memory system 1102 may also be used for storing programs executed by the processor(s) 1101. Possible implementations of this memory system may be, but are not limited to, static or dynamic random access memory (RAM), read only memory (ROM), or combination thereof.

In the illustrated embodiment, a storage device 1103 is also provided for storing information and instructions. A typical storage device 1103 may comprise nonvolatile memory. Common forms of storage devices include, for example, a hard drive, a magnetic disk, an optical disk, a CD-ROM, a DVD, a flash or other non-volatile memory, a USB memory card, or any other non-transitory computer-readable medium from which a computer can access data and instructions. Storage device 1103 may store source code, binary code, or software files for performing the techniques described above. In addition, while FIG. 11 shows that storage device 1103 as a local device connected with the components of the system, it will be appreciated by persons skilled in the art that the described techniques may use a storage device remote from the system, such as a database or other network storage device coupled with the computer system 1110 through a one or more network interface(s) 1104.

The network interface(s) 1104 may provide communications between the computer system 1110 and network(s) 1120. The network interface 1104 may be any wireless or wired connection, or any combination thereof. Computer system 1110 may further be configured to send and receive information through the network interface(s) 1104 across one or more networks 1120 such as a local area network (LAN), wide-area network (WAN), wireless or Bluetooth network, or the Internet 1130, etc. Computer system 1110 may access data and features on systems residing on one or multiple different computer hardware servers 1131-1134 across the network(s) 1120. The computer hardware servers 1131-1134 and associated software (not shown) may also reside in a cloud-computing environment.

Storage device 1103 and memory system 1102 are both examples of non-transitory computer readable storage media. Embodiments in this disclosure can be embodied in computer-readable code stored on any computer-readable medium, which when executed by a computer or other data processing system, can be adapted to cause the system to perform operations according to the techniques described in this disclosure. Computer-readable media may include any mechanism that stores information in a form accessible by a data processing system such as a computer, network device, tablet, smartphone, or any device having similar functionality. Examples of computer-readable media include any type of non-transitory, tangible media capable of storing information thereon, including hard drive disks ("HDDs"), solid-state devices ("SSDs") or other flash memory, optical disks, digital video disks ("DVDs"), CD-ROMs, magnetic-optical disks, ROMs, RAMs, erasable programmable read only memory ("EPROMs"), electrically erasable programmable read only memory ("EEPROMs"), magnetic or optical cards, or any other type of media suitable for storing data and instructions in an electronic format. Computer-readable media can also be distributed over a networked computer system stored and executed in a distributed manner.

Further, computer system 1110 may comprise a display 1112 for displaying information to a computer user. An input device 1111 such as a keyboard, touchscreen, and/or mouse may also be coupled to the interconnect bus 1105 for communicating information and commands via processor 1101. In some systems, the interconnect bus 1105 may represent multiple specialized interconnect buses. The combination of these components allows the user to communicate with the system. With these embodiments in mind, it will be apparent from this description that aspects of the described techniques may be embodied, at least in part, in software, hardware, firmware, or any combination thereof.

Although illustrative embodiments have been described herein with reference to the accompanying drawings, it is to be understood that the present invention is not limited to those precise embodiments, and that various other changes and modifications may be affected therein by one skilled in the art without departing from the scope or spirit of the invention. All such changes and modifications are intended to be included within the scope of the invention as defined by the following claims.

What is claimed is:

1. A method comprising:
at a computer system comprising a processor in communication with a memory configured to store programmed computer code executable by the processor for performing operations for conforming one or more shapes in one or more cells of an integrated circuit design to a valid pattern in a template:
selecting a cell shape from a cell to be conformed to the template;
specifying a granularity value and defining a set of alternative edge locations for the cell shape based on the granularity value, wherein the alternative edge locations are bounded within the granularity value;
generating a Boolean expression comprising aggregating a set of Boolean assertions for each combination of alternative edge locations within the granularity value and for one or more features of the cell shape;

computing a solution for the Boolean expression that corresponds with a valid pattern in the template; and modifying the cell shape in accordance with the solution when the Boolean expression evaluates to a Boolean TRUE result.

2. The method of claim 1 further comprising incrementing the granularity value when the Boolean expression evaluates to a Boolean FALSE result.

3. The method of claim 1 wherein the solution is computed based on matching Boolean assertions of different combinations of edge locations and shape features with valid patterns in the template in an iterative process.

4. The method of claim 1 wherein the Boolean expression requires exactly one pattern for each cell shape and requires the edges to match the valid pattern in the template.

5. The method of claim 1 further comprising generating an updated set of Boolean assertions for the incremented granularity value when the Boolean expression evaluates to a Boolean FALSE result.

6. The method of claim 1 further comprising translating the Boolean assertions into a conjunctive normal form for computing the solution.

7. The method of claim 1 wherein the one or more features of the cell shape are selected from the group consisting of: route, line end, size, middle position, left or right edge, top or bottom edge, X-Y position, and extension.

8. The method of claim 1 further comprising defining different granularities for a subset of the cell shape features and edge locations.

9. The method of claim 1 wherein the solution for the Boolean expression is computed using a Boolean satisfiability engine that comprises computer components adapted for processing Boolean assertions for a plurality of cell shapes based on their edge locations and features.

10. The method of claim 1 wherein a Boolean TRUE result indicates an acceptable cell shape and a Boolean FALSE result indicates an unacceptable cell shape.

11. A system comprising:
a processor;
a memory in communication with the processor, the memory configured to store programmed computer code executable by the processor for performing operations for conforming one or more shapes in one or more cells of an integrated circuit design to a valid pattern in a template, the operations comprising:
selecting a cell shape from a cell to be conformed to the template;
specifying a granularity value and defining a set of alternative edge locations for the cell shape based on the granularity value, wherein the alternative edge locations are bounded within the granularity value;
generating a Boolean expression comprising aggregating a set of Boolean assertions for each combination of alternative edge locations within the granularity value and for one or more features of the cell shape;
computing a solution for the Boolean expression that corresponds with a valid pattern in the template; and
modifying the cell shape in accordance with the solution when the Boolean expression evaluates to a Boolean TRUE result.

12. The system of claim 11 wherein the operations further comprise incrementing the granularity value when the Boolean expression evaluates to a Boolean FALSE result.

13. The system of claim 11 wherein the solution is computed based on matching Boolean assertions of different combinations of edge locations and shape features with valid patterns in the template in an iterative process.

14. The system of claim 11 wherein the Boolean expression requires exactly one pattern for each cell shape and requires the edges to match the valid pattern in the template.

15. The system of claim 11 wherein the operations further comprise generating an updated set of Boolean assertions for the incremented granularity value when the Boolean expression evaluates to a Boolean FALSE result.

16. The system of claim 11 wherein the one or more features of the cell shape are selected from the group consisting of: route, line end, size, middle position, left or right edge, top or bottom edge, X-Y position, and extension.

17. The system of claim 11 wherein the operations further comprise defining different granularities for a subset of the cell shape features and edge locations.

18. A nontransitory computer-readable medium adapted to store programmed computer code executable by a processor for performing operations to conform one or more shapes in one or more cells of an integrated circuit design to a valid pattern in a template, the operations comprising:
selecting a cell shape from a cell to be conformed to the template;
specifying a granularity value and defining a set of alternative edge locations for the cell shape based on the granularity value, wherein the alternative edge locations are bounded within the granularity value;
generating a Boolean expression comprising aggregating a set of Boolean assertions for each combination of alternative edge locations within the granularity value and for one or more features of the cell shape;
computing a solution for the Boolean expression that corresponds with a valid pattern in the template; and
modifying the cell shape in accordance with the solution when the Boolean expression evaluates to a Boolean TRUE result.

19. The nontransitory computer-readable medium of claim 18 wherein the operations further comprise incrementing the granularity value when the Boolean expression evaluates to a Boolean FALSE result.

20. The nontransitory computer-readable medium of claim 18 wherein the solution is computed based on matching Boolean assertions of different combinations of edge locations and shape features with valid patterns in the template in an iterative process.

* * * * *